United States Patent [19]

Bassani et al.

[11] 4,035,838

[45] July 12, 1977

[54] CABLE DISTRIBUTION SYSTEM FOR WIDE-BAND MESSAGE SIGNALS

[75] Inventors: Giovanpietro Bassani; Giuseppe Scozzari, both of Milan, Italy

[73] Assignee: Societa Italiana Telecomunicazioni Siemens S.p.A., Milan, Italy

[21] Appl. No.: 667,295

[22] Filed: Mar. 16, 1976

[30] Foreign Application Priority Data

Mar. 17, 1975 Italy .................................. 21314/75

[51] Int. Cl.² ........................................ H04N 7/10
[52] U.S. Cl. .................................. 358/86; 325/308
[58] Field of Search ......... 325/308; 178/6, DIG. 13

[56] References Cited

U.S. PATENT DOCUMENTS 3,936,747  2/1976  McVoy ...................... 178/DIG. 13

OTHER PUBLICATIONS

"Typical Applications of the Routing Switch" Cunningham Bulletin 131, Copyright 1965, pp. 24–25.

Primary Examiner—Richard Murray
Attorney, Agent, or Firm—Karl F. Ross; Herbert Dubno

[57] ABSTRACT

A cable-TV system comprises a relay station linked by several HF cables with a distribution center feeding several subscriber stations via two-wire local lines, each HF cable carrying a respective TV program modulated on a common carrier. The distribution center comprises several switching matrices which are remote-controlled from respective subscriber stations for transmitting selected programs to any of them. Each subscriber station includes for this purpose a generator of a carrier frequency, above the band of incoming frequencies, which is pulse-modulated with the aid of a keyboard to identify the desired programs and is demodulated at a control unit tied to the associated switching matrix at the distribution center.

9 Claims, 3 Drawing Figures

CABLE DISTRIBUTION SYSTEM FOR WIDE-BAND MESSAGE SIGNALS

FIELD OF THE INVENTION

Our present invention relates to a cable distribution system for wide-band message signals such as television programs.

BACKGROUND OF THE INVENTION

Cable-television (CATV) systems are widely used in the transmission of programs to receiving stations at shielded or isolated locations where normal viewing by antenna-fed receivers is unsatisfactory. In such systems the programs are relayed to various distribution points by separate high-frequency cables which may be part of a common trunk line. In a branched distribution system the receiving stations are connected to such a trunk line at various junctions; in a radial array a number of receiving stations are served through a common distribution center at the end of a trunk line.

In conventional CATV systems of the latter type, the subscribers at the receiving stations may select their programs with the aid of a switching network at the common distribution center, the switches of that network responding to d-c or low-frequency signals transmitted to the network over a line separate from the one used for supplying the selected program to the subscriber station.

OBJECTS OF THE INVENTION

The general object of our present invention is to provide a simplified distribution system, particularly for cable TV but not necessarily limited thereto, in which a distribution center is linked with each associated subscriber station by a single local line carrying selection signals to the distribution center and message signals to the subscriber station.

A more particular object is to provide a system of this kind whose local lines can also be used for the transmission of other messages in a lower frequency range, such as telephone, videophone or line-radio signals.

It is also an object of our invention to facilitate the supervision of active subscriber stations in such a system e.g. for the purpose of determining toll charges based on the duration of message reception.

SUMMARY OF THE INVENTION

In accordance with our present invention, each receiving or subscriber station includes a source of carrier wave having an elevated frequency above the band of messages (referred to hereinafter as TV programs) to be selectively received, this carrier wave being modulated with program-identifying pulse trains by a selector advantageously comprising a keyboard with self-locking keys adapted to be actuated one at a time. The carrier wave so modulated is transmitted to an associated control unit at the distribution center via a local line preferably consisting of two balanced conductors; at the control unit the carrier wave is demodulated and its pulse trains are translated into signals for operating an assigned switching matrix to connect that local line to a transmission path carrying the selected program.

BRIEF DESCRIPTION OF THE DRAWING

The above and other features of our invention will now be described in detail with reference to the accompanying drawing in which.

SPECIFIC DESCRIPTION

Figure 1:
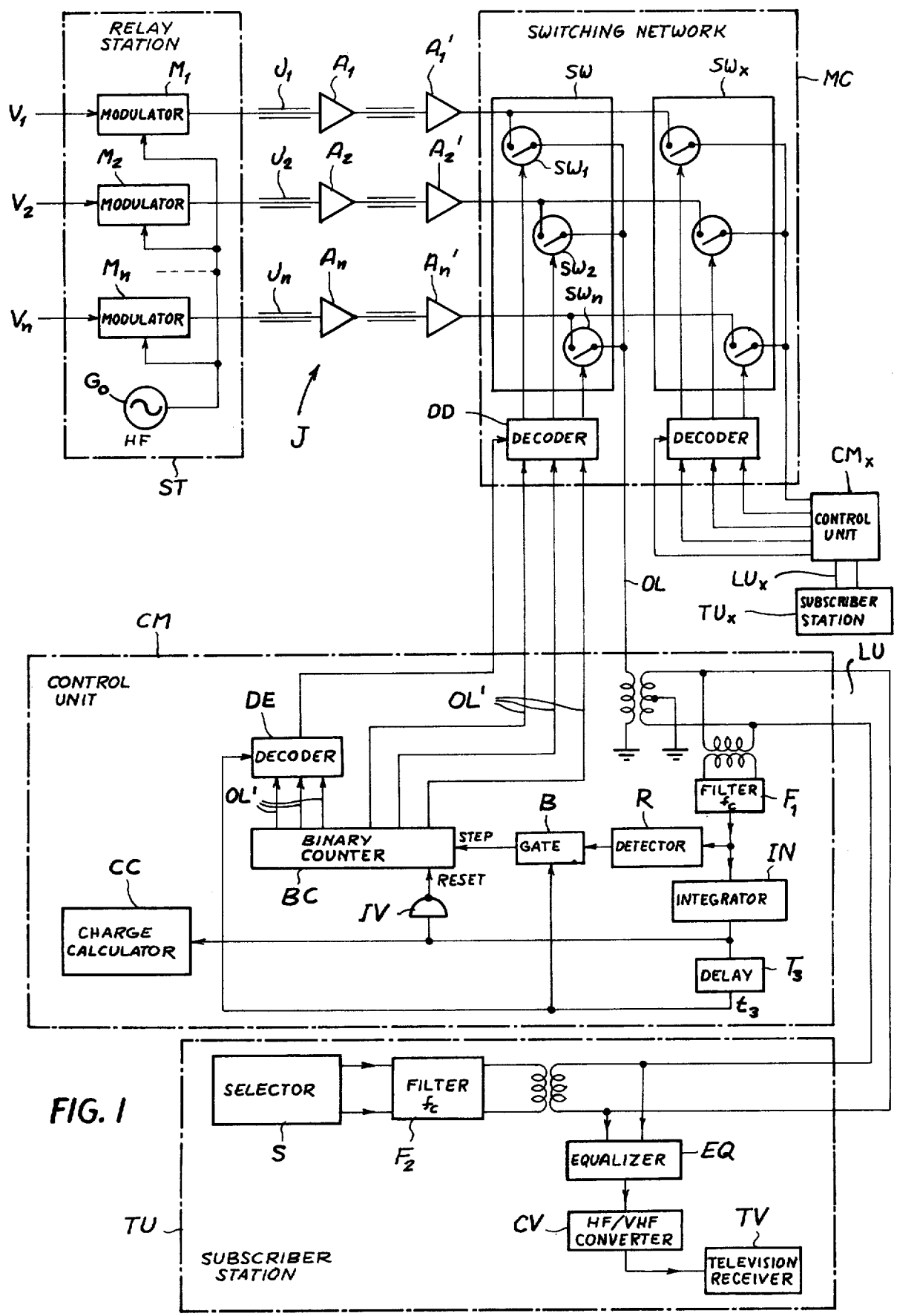
FIG. 1 is a diagrammatic overall view of a CATV distribution system embodying our invention.

In FIG. 1 we have shown a relay station ST of a CATV system picking up, e.g. via a master antenna, television programs $V_1, V_2, \ldots V_n$ received on different frequency channels as is usual in the industry.

The base band of each channel includes video signals in the range of 0–5 MHz and audio signals in the range of 20–15 kHz. The signals of each channel, properly limited in frequency and adjusted in phase, are fed to a respective modulator-amplifier $M_1, M_2, \ldots M_n$ receiving a high-frequency carrier wave from an oscillation generator $G_o$. The band of the modulated carrier may extend from 2.5 to 9.25 MHz. The wider-band signals emitted by modulators $M_1$–$M_n$ are sent to a distribution center, including a switching network MC and several control units $CM \ldots CM_x$, via respective transmission paths $J_1, J_2, \ldots J_n$ forming part of a common trunk J, these transmission paths being here shown as coaxial cables including amplifiers $A_1, A_2, \ldots A_n$ and $A_1', A_2', \ldots A_n'$. The cables can be used at the same time for signaling at frequencies below 2.5 MHz, e.g. in data or voice transmission.

The switching network MC comprises a plurality of matrices $SW \ldots SW_x$ assigned to respective subscriber stations $TU \ldots TU_x$, all these switching matrices being connected in parallel to the incoming transmission path so that their number can be varied at will as the number of associated subscriber stations changes. Each switching matrix comprises an array of preferably electronic switches $SW_1, SW_2, \ldots SW_n$ as particularly indicated for the first station SW. A matrix of this kind has been disclosed in commonly owned application Ser. No. 537,920, now U.S Pat. No. 3,969,638, filed Jan. 2, 1975 by one of us, Giovanpietro Bassani, jointly with Gianfranco Marchetti. As shown in that commonly owned application, the switches of such a matrix are controlled by a decoder — here designated DD — allowing one such switch at a time to be closed for delivering the corresponding message signals to an output lead OL. The number $n$ of switches per matrix, depending on the number of incoming programs, can also be changed as desired; in the present instance it will be assumed that $n = 8$.

The output lead OL of matrix SW extends to the associated control unit CM where the incoming message signals are fed to a balanced two-wire local line LU leading to the affiliated subscriber station TU; a similar line $LU_x$ is seen to extend between control unit $CM_x$ and subscriber station $TU_x$. Line LU feeds a television receiver TV in station TU by way of an equalizer EQ and a frequency converter CV transposing the incoming HF band into the VHF range to which the receiver TV is tuned; this receiver, therefore, may be of the usual type designed for aerial pickup and does not require any particular adaptation.

Figure 2:
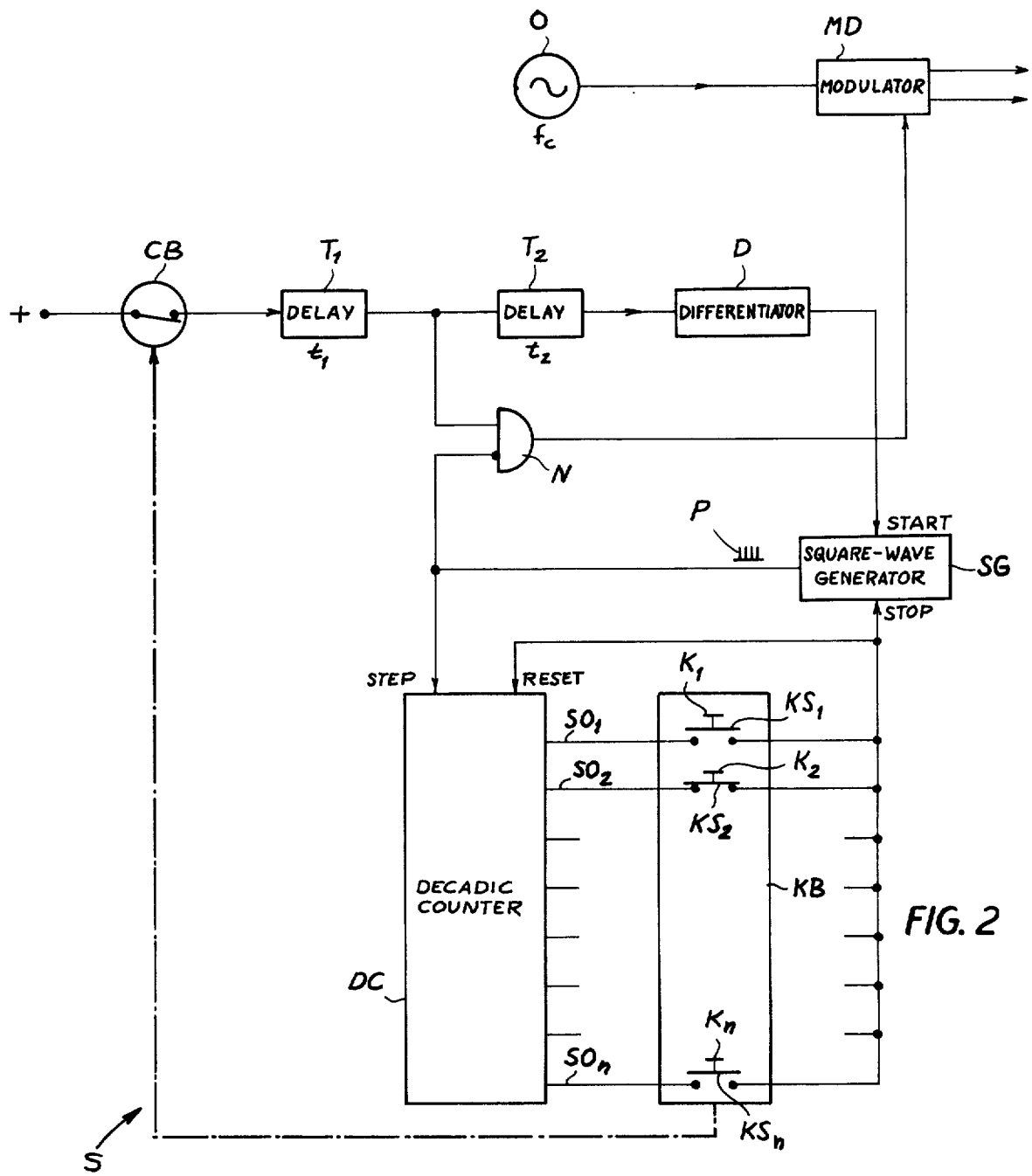
FIG. 2 is a more detailed view of a program selector shown in block form in FIG. 1.

Subscriber station TU further includes a selector S, more fully described hereafter with reference to FIG. 2, which works through a filter $F_2$ into line LU for the purpose of transmitting to control unit CM a carrier wave of an elevated frequency $f_c$ well above the band of incoming TV signals; frequency $f_c$ may be 13.2 MHz, for example. This carrier wave, serving for channel selection and as a continuity signal, passes a filter $F_1$ in unit CM and reaches a detector R forming part of a demodulation circuit controlling the decoder DD in a manner more fully described below.

Selector S, illustrated in FIG. 2, comprises a keyboard KB with $n$ pushbutton-type keys $K_1, K_2, \ldots K_n$ which can be individually depressed to select one of the $n$ available TV channels. These keys are mechanically interconnected, in a manner well known per se, to prevent the actuation of more than one key at a time. Thus, the lowering of one key (e.g. $K_2$) locks that key actuated, against the force of a restoring spring, and automatically releases any previously locked key (e.g. $K_1$). This operation closes an individual key switch $KS_1$, $KS_2, \ldots KS_n$ and also a common circuit breaker CB in the input of a timing circuit $T_1$ which is effective to delay a rising (but not a falling) pulse flank for a predetermined period $t_1$ of, say, 200 ms. A nonillustrated release button may be depressed to cut off all reception by restoring the key last depressed, thereby opening the circuit breaker CB. If, however, the actuation of one key is accompanied by the release of another key previously depressed, circuit breaker CB opens only for a brief instant and recloses immediately to energize or re-energize (after an intervening delay period $t_1$) one input of an AND gate N in parallel with another timing circuit $T_2$ introducing a delay of duration $t_2$ which may be somewhat less than period $t_1$ (see FIG. 3). After this second delay, a differentiation circuit D is energized to start a square-wave generator SG working on the one hand into an inverting second input of AND gate N and on the other hand into a stepping input of a decadic counter DC whose $n$ stage output $SO_1, SO_2, \ldots SO_n$ are sequentially energized by pulses P emitted at this time by generator SG. Key switches $KS_1-KS_n$ are included in the leads from the stage outputs $SO_1-SO_n$ of counter DC and extend to a stopping input of generator SG as well as to a resetting input of counter DC. Thus, the number of pulses P emitted by generator SG depends on the setting of keyboard KB and, in the present instance, is limited to two since the second pulse energizes the output $SO_2$ in series with the actuated switch $KS_2$.

Figure 3:
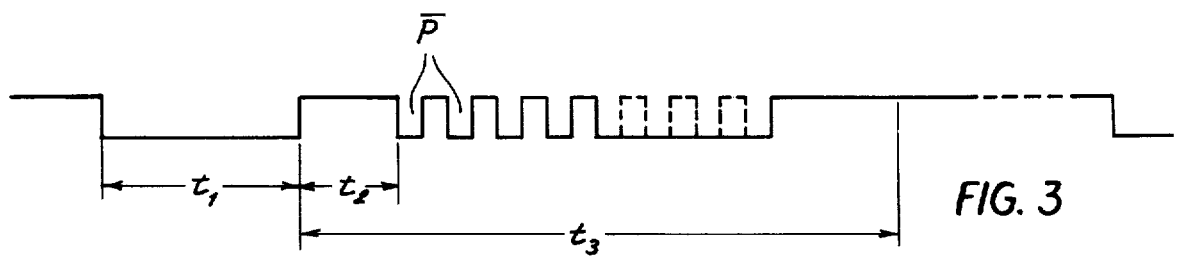
FIG. 3 is a graph of a pulsed carrier wave used in the system of FIGS. 1 and 2.

A modulator MD receives the carrier wave of frequency $f_c$ from the local oscillator O and also receives the output of AND gate N for amplitude-modulating that carrier wave in accordance with the operation of generator SG. During continuous reception, with circuit breaker CB closed and generator SG inoperative, gate N has an output which lets the full amplitude of the carrier wave from oscillator O traverse the modulator MD to the filter $F_2$ (FIG. 1) for transmission over Line LU to control unit CM. When the circuit breaker CB is opened, however briefly, gate N ceases to conduct for at least 200 ms and cuts off the output of modulator MD for a like period as illustrated in FIG. 3. Upon reclosure of the circuit breaker and re-energization of timing circuit $T_2$, the leading edge of this d-c signal reaches the differentiator D after the interval $t_2$ and triggers the square-wave generator SG into emission of its train of pulses P. The inversions $\bar{P}$ of these pulses are transmitted by gate N to modulator MD and result in corresponding short-term interruptions of the carrier. The number of these interruptions, therefore, corresponds to the number of pulses P emitted by generator SG. If the delay $t_1$ is inherent in the operation of the keyboard KB, timing circuit $T_1$ may be omitted.

At the control unit CM the detector R re-establishes the pulses P and transmits them through a gate B to a stepping intput of a digital (binary) counter CB which has a resetting input connected to the output of filter $F_1$ through an integrator IN and an inverter IV. The integrator IN bridges the pulse gaps $\bar{P}$ and thus produces a continuous voltage as long as the carrier frequency $f_c$ is received from line LU. The output voltage of integrator IN also reaches a timing circuit $T_3$ with a delay period $t_3$ which is long enough to let the counter BC be stepped by the maximum number $n$ of selection pulses. After this delay the timer $T_3$ cuts off the gate B so that counter BC remains in the condition last reached until the cessation of carrier frequency $f_c$ causes it to be reset. The output voltage of integrator IN is further fed to charge calculator CC as a measure of the time during which a program is received by subscriber station TU.

In the assumed case of $n = 8$, three output leads OL' of binary counter BC will suffice to control the switching matrix SW through decoder DD. It could happen, however, that the keyboard KB of station TU is equipped with a larger number of keys so that one or more of these keys would not correspond to an available program. If such a key were inadvertently actuated, the counter BC would energize one or more additonal output leads OL" terminating at a decoder DE which, in that instance, would send to switching network MC a signal blocking the decoder DD.

We claim:
1. A system for the selective channeling of a plurality of wide-band messages, arriving simultaneously over separate transmission paths at a distribution center, to any of several receiving stations served by said center, comprising:
    a plurality of switching matrices at said center respectively assigned to said receiving stations, said transmission paths being connected in parallel to all said matrices;
    a control unit for each of said matrices at said center;
    a local line extending from each receiving station to the associated control unit;
    selector means at each receiving station including a source of carrier wave having an elevated frequency above the band of messages and circuitry for modulating said carrier wave with message-identifying pulse trains and transmitting the modulated carrier wave to the associated control unit via the respective local line; and
    demodulating means in said control unit connected to said local line for translating said pulse trains into signals for switching the assigned matric to connect said local line to the transmission path carrying the selected message;
    said selector means comprising a pulse generator, a keyboard with self-locking keys whose actuation automatically releases a previously actuated key thereof, and signal-generating means responsive to actuation of any of said keys for activating said pulse generator to start the emission of a pulse train;
    said circuitry including a pulse counter connected to said pulse generator for stepping by said pulse train, a modulator connected to said source and to said pulse generator for amplitude-modulating said carrier wave with said pulse train, and emission-stopping means jointly controlled by said pulse counter and by said keyboard for terminating said pulse train upon the attainment of a pulse count corresponding to an actuated key.

2. A system as defined in claim 1 wherein said pulse counter has a plurality of stage outputs with leads successively energized by incoming stepping pulses, said leads extending to a blocking input of said pulse generator, said emission-stopping means including a normally open switch in each of said leads closable by actuation of the corresponding key.

3. A system as defined in claim 1 wherein said signal-generating means includes timing means connected to said modulator for interrupting the transmission of said carrier wave for a predetermined period and delay means for starting the emission of said pulse train a predetermined time after the end of said period.

4. A system as defined in claim 1 wherein said demodulating means comprises a filter tuned to said elevated frequency for isolating said carrier wave, a detector connected to said filter for recovering said pulse train, and a digital counter with a stepping input energizable by said detector and with an output circuit extending to the corresponding switching matrix.

5. A system as defined in claim 4 wherein said demodulating means further comprises an integrator connected to said filter for receiving said carrier wave, said digital counter being provided with an input connected to said integrator for resetting said digital counter upon prolonged absence of said carrier wave.

6. A system as defined in claim 4, further comprising calculating means connected to said filter for determining a toll charge commensurate with the duration of message reception by the associated receiving station.

7. A system as defined in claim 4 wherein said demodulating means further comprises delayed blocking means connected to said filter for disconnecting said stepping input from said detector a predetermined interval after reception of said pulse train.

8. A system as defined in claim 1 wherein said local line comprises two balanced conductors.

9. A system as defined in claim 1 wherein said messages are television programs, said receiving stations including television receivers connected to the respective local lines through a frequency converter.

* * * * *